(12) United States Patent
Wang (10) Patent No.: US 8,304,694 B2
(45) Date of Patent: Nov. 6, 2012

(54) ELECTRIC HEATING MATERIAL AND LAMINATE FLOOR CONTAINING SAME AND METHOD FOR PRODUCING THE LAMINATE FLOOR

(76) Inventor: Boquan Wang, Jiangsu (CN)

( * ) Notice: Subject to any disclaimer, the term of this patent is extended or adjusted under 35 U.S.C. 154(b) by 633 days.

(21) Appl. No.: 12/583,822

(22) Filed: Aug. 26, 2009

(65) Prior Publication Data
US 2010/0116808 A1 May 13, 2010

(30) Foreign Application Priority Data

Nov. 11, 2008 (CN) ............................ 2008 1 0234317
Feb. 24, 2009 (CN) ............................ 2009 1 0025126

(51) Int. Cl.
*H05B 3/34* (2006.01)
(52) U.S. Cl. ............................ 219/213; 219/528; 219/548
(58) Field of Classification Search ................. 219/213, 219/528, 548
See application file for complete search history.

(56) References Cited

U.S. PATENT DOCUMENTS
2006/0278631 A1* 12/2006 Lee et al. ........................ 219/529

FOREIGN PATENT DOCUMENTS
CN 201111529 Y 9/2008
CN 101361632 A 2/2009
WO WO 2009/055999 A1 5/2009

* cited by examiner

*Primary Examiner* — Marc Armand
(74) *Attorney, Agent, or Firm* — Hudak, Shunk & Farine LPA (57) ABSTRACT

The present invention relates to an electric heating material. Said electric heating material comprises a substrate and an electric heating layer substantially homogeneously attached to said substrate. Said electric heating layer is obtained from an electric heating coating that contains an electric heating base material and a binder. Said electric heating base material is selected from the group consisting of natural graphite, artificial graphite or conductive carbon black; said binder is selected from the group consisting of acrylic resin, epoxy resin, polyurethane, melamine, gelatin, carboxymethyl cellulose, or polyvinyl alcohol. In some embodiments, the substrate is paper. Said electric heating material can be applied to make an electric heating laminate floor the temperature of the surface of which can be heated to 15-70° C. within 5 minutes when a 220 V power source is supplied, and this temperature can be kept consistent for a long period of time. The electric heating laminate floor can be applied to replace existing ground heating systems and is reliable, safe, energy saving, easy to repair and replace as well as cost effective.

13 Claims, 4 Drawing Sheets

ELECTRIC HEATING MATERIAL AND LAMINATE FLOOR CONTAINING SAME AND METHOD FOR PRODUCING THE LAMINATE FLOOR

CROSS REFERENCE

The present invention claims priority to Chinese patent application No.: 200810234317.6, filed Nov. 11, 2008, titled "Assembled Piercing Electrode" and Chinese patent application No.: 200910025126.3, filed Feb. 24, 2009, titled "Electric Heating Material and Laminate Floor Containing Same and Method for Producing the Laminate Floor".

FIELD OF THE INVENTION

The present invention relates to an electric heating material. More specifically, the present invention relates to an electric heating paper that can generate heat when power is supplied. When supplied with 220 V or 110 V power, the surface temperature thereof can be up to 15-70° C. within 5 minutes. The electric heating paper of the present invention can be applied to produce electric heating laminate floor to replace existing ground heating systems. Said heating laminate floor is cost effective, reliable, energy saving and easy to repair and replace.

TECHNICAL BACKGROUND OF THE INVENTION

The existing material using power for ground heating includes constant power heating cable and infrared carbon-heating plastic film, both are single function material. In general, the structure of constant power heating cable ground heating system is very complicated. When building such type of ground heating system, a polystyrene foam board insulation layer having a thickness of about 25 mm is first paved on the concrete floor, then paving steel wire mesh on the insulation layer, constant power heating cable is bond on the steel wire mesh and arranged in a shape of snake, pouring fine-stone concrete having a thickness of about 30-40 mm; and finally paving conventional laminate floor on the fine-stone concrete when it is fully solidified. This heating structure is generally thick and it is relatively difficult and sometimes impossible, to replace or repair the same because the constant power heating cable is arranged in the fine-stone concrete. The heating structure that uses infrared carbon-heating plastic film is also relatively complicated. When building such type of ground heating system, a polystyrene foam board insulation layer having a thickness of about 25 mm is first paved on the concrete floor, then paving infrared carbon-heating film that has wiring arranged therein, and finally paving conventional laminate floor on the infrared carbon-heating film. Even though the structure described as above is somewhat thinner, but the structure is still relatively thick and it is impossible that the infrared generated by the carbon-heating film travel through the laminate floor. Both the existing two ground heating systems have common deficiencies, such as the structure being complicated, decreasing the available height of the building, big heat loss, high energy consumption, long heat transfer path. Moreover, the heat has to be transferred into the room by travelling through the laminate floor that is of poor thermal conductivity and the heat transfer is relatively slow. Both ground heating systems also require numerous materials as well as cumbersome labor work.

SUMMARY OF THE INVENTION

The present invention provides an electric heating material to overcome the deficiencies of the existing heating systems using power as the power source. Said electric heating material is simple, energy saving and of quick heat transfer. Additionally, the surface temperature of the electric heating material is easy to control. Said electric heating material comprises a substrate, and an electric heating layer attached to the substrate. Said electric heating layer comprises an electric heating base material and a binder. Said substrate can be any type material adapted for being printed.

Said substrate is preferably selected from paper material. Of course, plastics or other materials adapted for being printed may also be used in the present invention.

Said electric heating base material is selected from the group consisting of natural graphite, artificial graphite, or electric carbon black. Said binder is selected from a group of resin adhesives consisting of acrylic resin, epoxy resin, polyurethane, melamine, or combinations thereof. Said binder can also be selected from gelatin, carboxymethyl cellulose, polyvinyl alcohol, or combinations thereof.

In one embodiment of the present invention, the electric heating layer is obtained by first preparing an electric heating coating and then printing the coating on the substrate in a substantially homogeneous manner.

The principal formula of the electric heating coating consists essentially of an electric heating base material and a binder. The amount of the electric heating base material is about 5% to about 85% by weight of the total principal formula; the amount of the binder is about 15% to about 95% by weight of the total principal formula.

When acrylic resin, epoxy resin, polyurethane, or melamine is used to prepare the electric heating coating, anhydrous alcohol or acetone is used to be the solvent. The amount of the solvent is about 100% to 300% of the weight of said binder.

When gelatin, carboxymethyl cellulose, or polyvinyl alcohol (PVA) is used to prepare the electric heating coating, water is used as the solvent and the amount thereof is about 100% to about 300% by weight of said binder.

If required, suitable amount of additives such as triethanolamine, hydroquinone, coupling agent, flame retardants, toughening agent can be used in the present invention.

The thickness of the electric heating layer is from about 5 microns to about 200 microns, desirably in the range of about 20 microns to 180 microns.

Said paper can be any type of paper material adapted for being printed, preferably the paper material that is flexible, firm and durable and not broken when exerted relatively high pressure and pulling force. Such paper material includes but without limitation to kraft paper, writing paper, printing paper, industry filter paper, untreated base paper that is of good permeability. In addition, fiber cloth such as industry filter cloth, densely spined glass cloth, nonwoven cloth, common cotton cloth or chemical fiber cloth can also be used in the present invention.

In a preferred embodiment of the present invention, the electric heating coating is substantially homogeneously printed on said paper material by screen printing and the electric heating layer so printed is in a shape of frame. The thickness of the electric heating layer is in the range of about 40 microns to 180 microns.

In a further preferred embodiment of the present invention, the electric heating coating is substantially homogeneously printed on said paper material by screen printing and the electric heating layer so printed is in a shape of mesh. The thickness of the electric heating layer is in the range of about 40 microns to 180 microns.

The electric heating paper of the present invention can utilize normal power source (220 V or 110 V). When supplied power via an electrode arranged on the electric heating paper, the surface temperature thereof can be up to about 15° C. to about 70° C. within 5 minutes and then kept consistent in said temperature range.

The electric heating paper can be utilized to make an electric heating laminate floor. In addition to said electric heating paper, the electric heating laminate floor of the present invention comprises at least one layer of any layer of the following: base material layer, balance layer, thermal diffusion layer, decoration layer, wear resistant layer. In order to improve the peeling strength and tensile strength of the electric heating paper in respect of its adjacent layers, it is desirable to arrange apertures on the paper material or utilize industry filter paper, industry filter cloth, or untreated base paper that is of good permeability so that the resin binder can readily penetrate the electric heating paper and attach the electric heating paper firmly to adjacent layers of the electric heating laminate floor.

In order to improve the strength and anti-deformation ability of the electric heating laminate floor of the present invention, at least one fiber reinforcement layer may be inserted between the surface layer and its adjacent layer, and/or the bottom layer and its adjacent layer of the floor. Said fiber reinforcement layer can be any material that is of high fracture strength and small elongation rate, such as but without limitation to glass fiber mesh or carbon fiber mesh.

The present invention also discloses an electrode specifically designed for the electric heating laminate floor of the present invention and methods for making the electric heating paper and the electric heating laminate floor including said electric heating paper.

DETAILED DESCRIPTION OF THE INVENTION

The present invention will be further described by referring to the accompanying drawings. It should be understood that the embodiments depicted in the drawings are for description of the invention only and shall not be construed as any limitation to the present invention. The scope of the invention would rather be defined by the appended claims.

Figure 1:
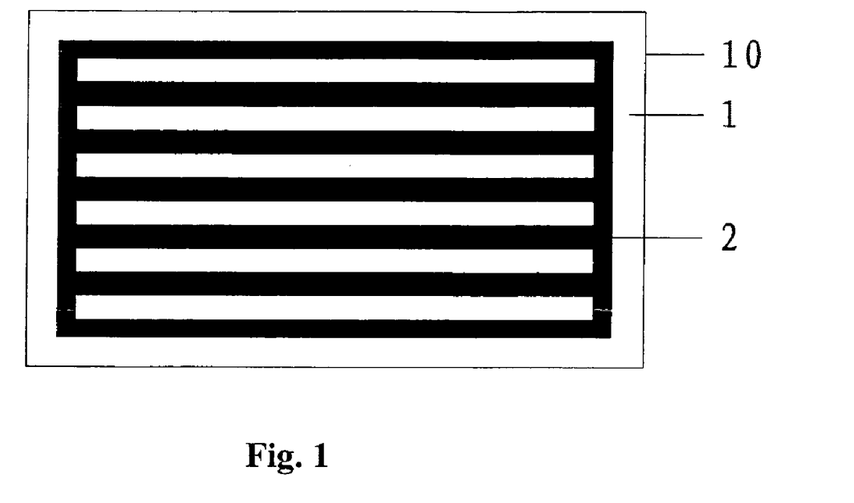
FIG. 1 is a schematic structure diagram of an electric heating paper of the present invention.

FIG. 1 is a schematic structure diagram of an electric heating paper of the present invention. As shown in FIG. 1, the electric heating paper 10 includes a paper layer 1 and an electric heating layer 2 that is attached to the paper layer 1. Said paper layer is a kraft paper having a specification of 40-120 g/m$^2$. Said electric heating layer 2 comprises an electric heating base material and a binder.

The electric heating layer is obtained by first preparing an electric heating coating and then screen-printing the coating on the substrate in a substantially homogeneous manner.

The electric heating layer 2 is capable of generating heat quickly and even when connected to normal power such as 220 V DC power or 220 V AC power. Additionally, the surface temperature of the electric heating paper is relatively low, i.e. lower than 70° C. To achieve this purpose, said electric heating base material is selected from the group consisting of natural graphite, artificial graphite, conductive carbon black, or combinations thereof. Said binder is selected from a group of resin adhesives consisting of acrylic resin, epoxy resin, polyurethane, melamine, or combinations thereof. Said binder can also be selected from the group consisting of gelatin, carboxymethyl cellulose, polyvinyl alcohol, or combinations thereof. However, any other binders may also be used in the present invention.

The principal formula of the electric heating coating consists essentially of an electric heating base material and a binder. The amount of the electric heating base material is about 5% to about 85% by weight of the total principal formula.

The binder used in the present invention is selected from a group of resin adhesives consisting of acrylic resin, epoxy resin, polyurethane or melamine; other binders such as gelatin, carboxymethyl cellulose, or polyvinyl alcohol may also be applied in the present invention. The amount of the binder is about 15% to about 95% by weight of the total principal formula described as above.

In order to adjust the conductivity and heating property of the electric heating coating, silicon carbide powder or calcined coke powder may be optionally used in the present invention. The amount of said calcined coke powder or silicon carbide powder is from about 0% to about 20% by weight of the principal formula.

Additionally, suitable amount of chemical additives, such as triethanolamine, hydroquinone, coupling agent, flame retardants, toughening agent can also be used in the present invention based on what the specific electric heating base material and binder is used. Said coupling agent can be obtained from the market, such as but without limitation to KH-550 coupling agent manufactured by Qufu Huarong Chemicals, Shandong Province; Said flame retardants is antimony trioxide and the like, which can be obtained from Jinan Xiangmeng Flame Retardants material, Shandong Province. Said toughening agent is dioctyl phthalate and the like, which can be obtained but without limitation to Qilu plasticizers, Shandong Province. When required, the amount of the coupling agent is about 0.5% to 1.0% by weight of the principal formula; the amount of the flame retardants is about 2% to 5% by weight of the principal formula; the amount of the toughening agent is about 2% to 5% of the principal formula; the amount of triethanolamine is 3% to 7% by weight of the principal formula; and the amount of hydroquinone is about 2% to 5% by weight of the principal formula.

To obtain the electric heating layer, an electric heating coating is prepared for the first step. When a resin adhesive, such as acrylic resin, epoxy resin, polyurethane or melamine is used, said resin adhesive is mixed substantially homogeneously with a solvent that is selected from ethanol or acetone. The amount of the solvent is about 100% to about 300% of the resin adhesive. Then, the electric heating base material is added to the mixture to obtain a homogeneous electric heating coating. If required, suitable amount of triethanolamine, hydroquinone, coupling agent, flame retardants or toughening agent is additionally added to the mixture. Finally, the homogeneous electric heating coating will be homogeneously printed on a substrate, such as a paper via screen printing.

When a water soluble binder, such as gelatin, carboxymethyl cellulose, or polyvinyl alcohol is used, said binder is first dissolved fully in water. The amount of water is about 100% to about 300% of the binder. Then, the electric heating base material is added to the mixture to obtain a homogeneous electric heating coating. If required, suitable amount of chemical additives such as triethanolamine, hydroquinone, coupling agent, flame retardants, toughening agent or silicon carbide powder, calcined coke powder is additionally added to the mixture. Finally, the homogeneous electric heating coating will be homogeneously printed on a substrate, such as a paper via screen printing. As shown in FIG. 1, the electric heating coating is screen printed in a shape of frame on a paper having sufficient strength and toughness.

When the electric heating layer 2 is cured, an electrode is installed and fully connected to said electric heating layer. When power is supplied, the electric heating layer will generate heat. Of course, other means known in the art can also be applied to connect electric heating layer 2 to a power source. The power source can be DC type or AC type and the voltage can be 220 V but other voltages can also be used.

The thickness of said electric heating layer 2 is in the range of about 5 microns to about 200 microns, preferably in the range of about 20 microns to about 180 microns.

Figure 2:
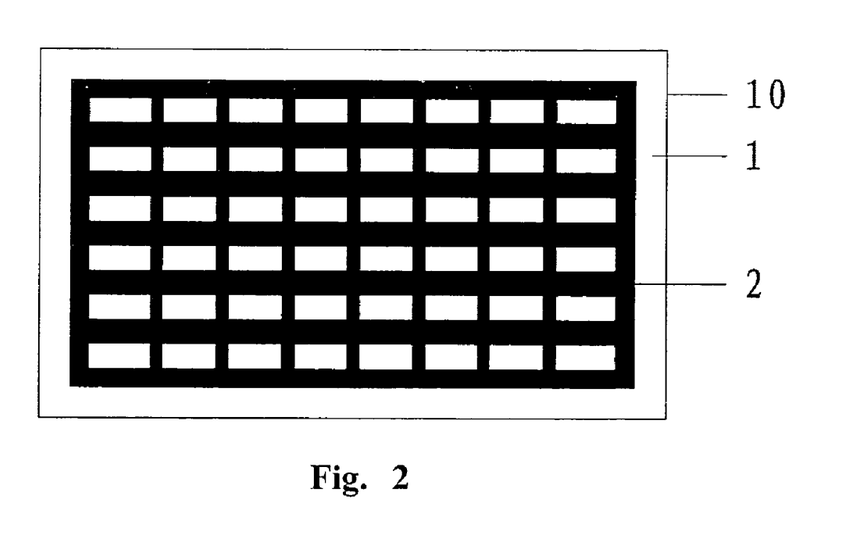
FIG. 2 is a schematic structure diagram of another electric heating paper of the present invention.

FIG. 2 is a schematic structure diagram of another electric heating paper of the present invention. As shown in FIG. 2, the electric heating layer is in a shape of mesh in order to obtain a much even resistance value in the whole heating area. The electric heating layer 2 shown in FIG. 2 can also be made via screen printing.

Figure 3:
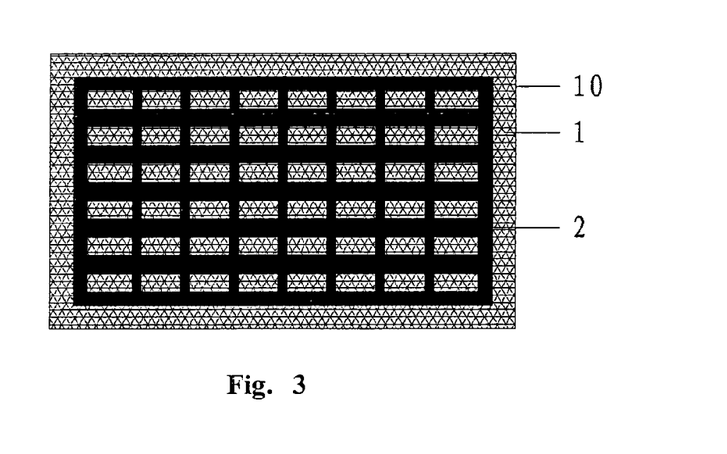
FIG. 3 is a schematic structure diagram of further another electric heating paper of the present invention.

FIG. 3 is a schematic structure diagram of further another electric heating paper of the present invention. As shown in FIG. 3, the electric heating paper is distinct from that shown in FIG. 1 by using an industry filter paper instead of a kraft paper. When the electric heating paper shown in FIG. 3 is used to make an electric heating laminate floor, the resin adhesive can penetrate said industry filter paper and bind said electric heating paper with its adjacent layers firmly.

Figure 4:
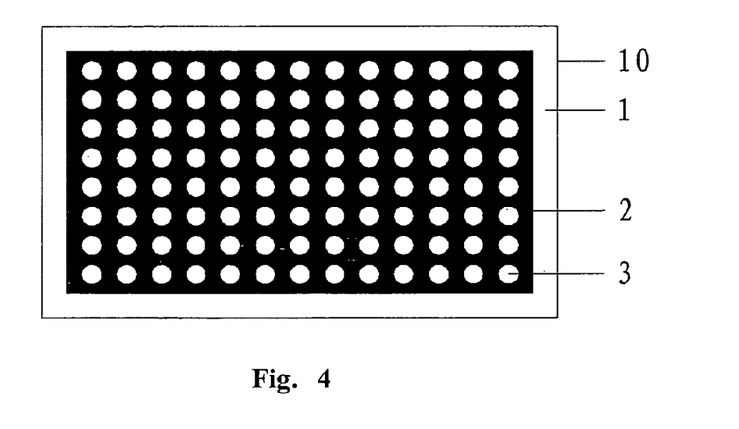
FIG. 4 is a schematic structure diagram of further another electric heating paper of the present invention.

FIG. 4 is a schematic structure diagram of further another electric heating paper of the present invention. As shown in FIG. 4, the electric heating paper is distinct from that shown in FIG. 1 by making a plurality of apertures 5 on said electric heating paper 1. When the electric heating paper shown in FIG. 4 is used to make an electric heating laminate floor, the resin adhesive can pass through said apertures 5 and bind said electric heating paper 1 with its adjacent layers firmly.

Figure 5:
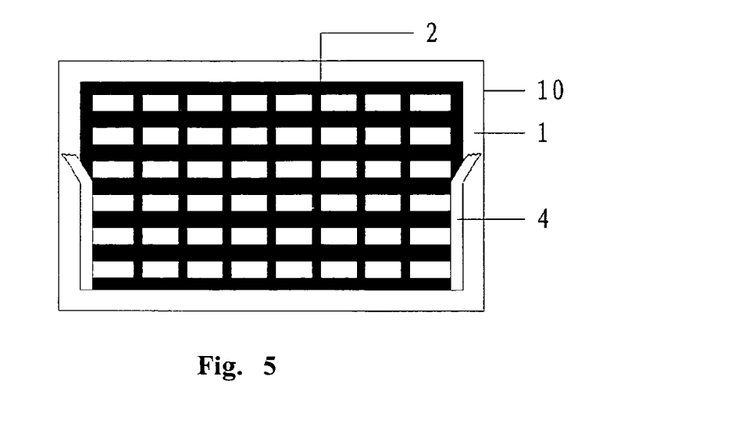
FIG. 5 is a schematic structure diagram of further another electric heating paper of the present invention.

FIG. 5 is a schematic structure diagram of further another electric heating paper of the present invention. As shown in FIG. 5, the electric heating paper is distinct from that shown in FIG. 1 by using a conductor having good conductive ability at the area where an electrode is installed. Examples of the conductor include aluminum foil, copper foil and the like. Said conductor is used to increase the contact area of the electrode and the electric heating layer and thus decrease the contact electrical resistance and prevent overheating or burning in said contact area.

Figure 6:
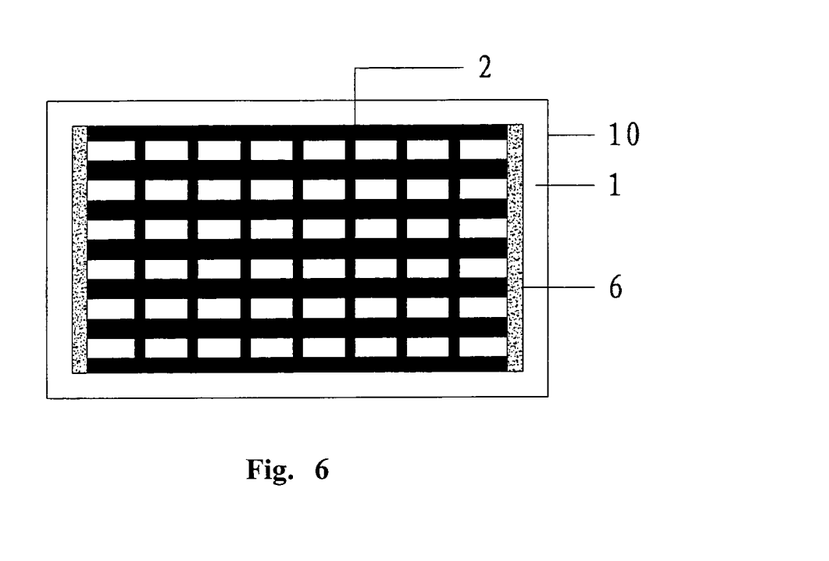
FIG. 6 is a schematic structure diagram of further another electric heating paper of the present invention.

FIG. 6 is a schematic structure diagram of further another electric heating paper of the present invention. As shown in FIG. 6, the electric heating paper is distinct from that shown in FIG. 1 by printing a layer of metallic ink having good conductive ability at the area where an electrode is installed. Examples of the metallic ink include silver paste, aluminum paste and the like. Said metallic ink is used to decrease the contact electrical resistance and prevent overheating or burning in said contact area.

The electric heating paper described in the present invention can be readily industrialized and is cost effective. The electric heating paper can also be marketed as a single product.

Figure 7:
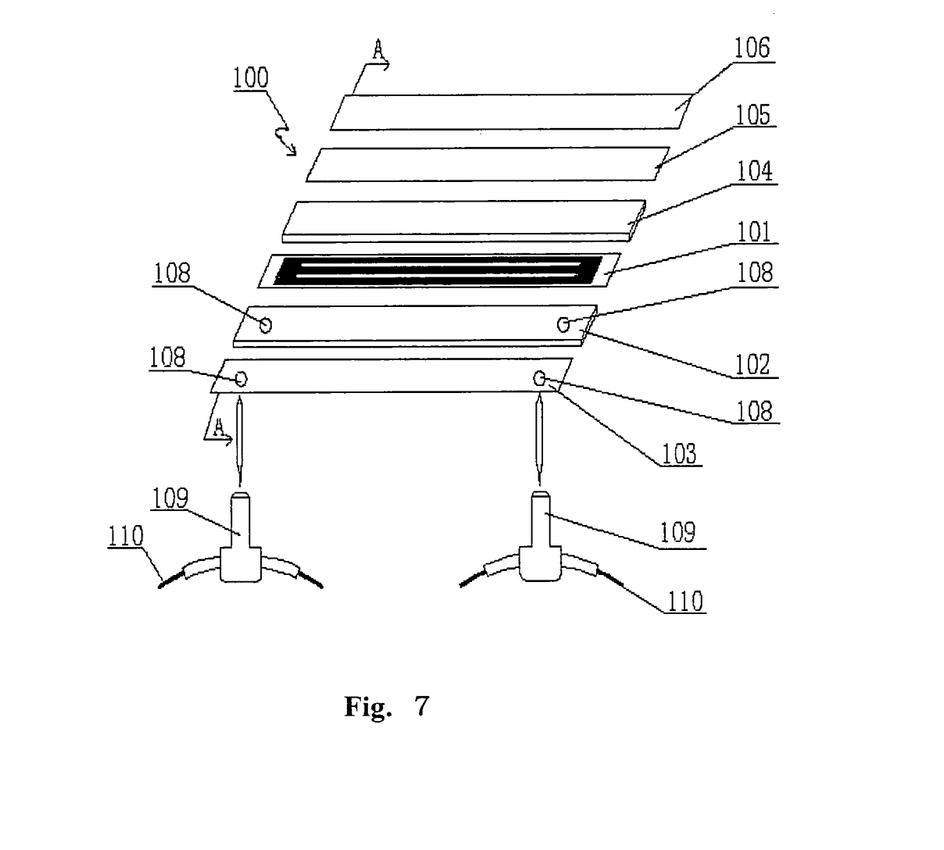
FIG. 7 is an exploded structure diagram of an electric heating laminate floor including the electric heating paper of the present invention.

FIG. 7 is an exploded structure diagram of an electric heating laminate floor including the electric heating paper of the present invention. As shown in FIG. 7, said electric heating laminate floor includes an electric heating paper shown in any of the FIG. 1, 2, 3, 4, 5 or 6, and at least one layer of a base material layer 102, a balance layer 103, a thermal diffusion layer 104, a decoration layer 105, or a wear resistant layer 106.

When making the electric heating laminate floor shown in FIG. 7, the opposite sides of the electric heating paper 101 are first painted with resin adhesive and then is combined with the base material layer 102 having an aperture 108 prepared for installing the electrode 109 and the heat diffusion layer 104. Finally, the balance layer 103, the combination of the electric heating paper 101, base material layer 102 and thermal diffusion layer 104, the decoration layer 105 and the wear resistant layer 106 is arranged in order and formed as a laminate floor. The laminate floor is then cut, slotted, checked, packed and ready to be shipped to customers.

Said resin adhesive is selected from the group consisting of modified urea-formaldehyde resin, modified phenolic resin, epoxy resin, polyurethane or melamine.

Desirably, said base material layer 102 and thermal diffusion layer 104 is medium density fiberboard or high density fiberboard. However, other wood material commonly used in the art may also used in this invention. Said balance layer 103, decoration layer 105 or wear resistant layer 106 is desirably melamine impregnated paper. Of course, other materials commonly used in the art may also be used in this invention.

The electrode 109 shown in FIG. 7 is an assembled piercing electrode specifically designed for the electric heating laminate floor of the invention. Said electrode can be readily installed on spot. Said electrode 109 comprises a plastic housing and a needle electrode. Said needle electrode is inserted in said plastic housing. Said electric housing is inserted in an aperture pre-machined on the laminate floor and has a tight fit in respect of said aperture. One end of said electrode pierces into the electric heating paper and is well connected with said electric heating layer, while another end of said electrode pierces into the insulation layer of a conductor that passes through a passage arranged in said plastic housing and is well connected with said conductor.

Figure 8:
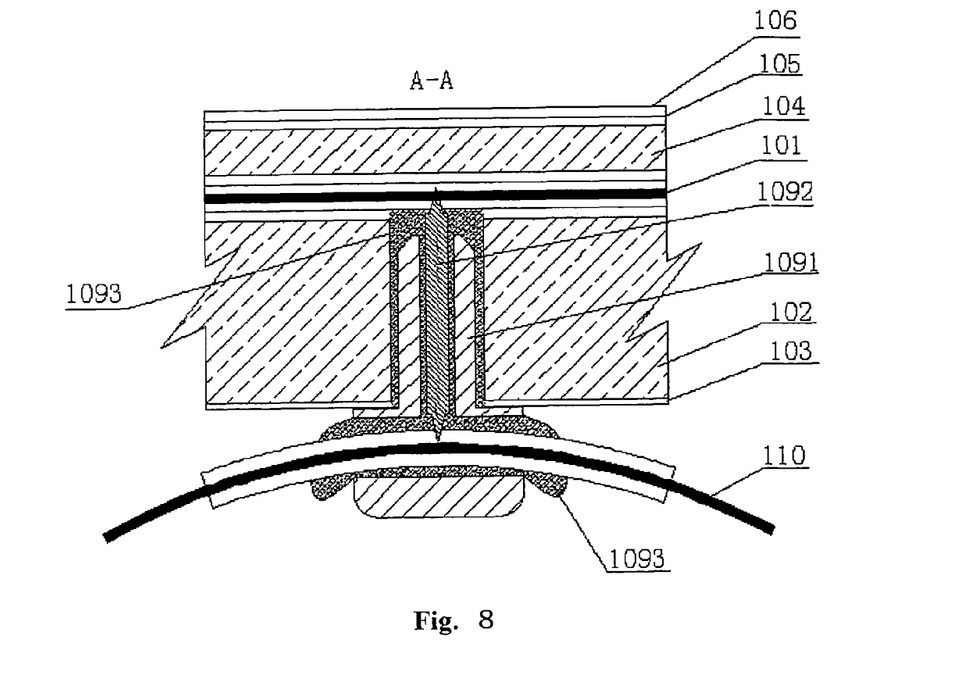
FIG. 8 is an A-A sectional view of the electric heating floor showing an electrode specifically designed for the electric heating laminate floor of the present invention.

FIG. 8 is an A-A sectional view of the electric heating laminate floor shown in FIG. 7, wherein the section just goes through the assembled piercing electrode 109. As shown in FIG. 8, said assembled piercing electrode 109 comprises a plastic housing 1091 and a needle electrode 1092. Said plastic housing 1091 has a path in which said needle electrode can be inserted. At the opposite sides of the path, insulation glue-guiding grooves (not shown) are arranged so that the insulation glue can go along said grooves to arrive at the position at which the needle electrode is connected with said conductor 110 and further goes out from said conductor passage to ensure a waterproof connection. Said needle electrode 1092 is inserted into the path and has a needle tip at each end thereof. When the needle electrode 1092 is well assembled and positioned, one tip of the needle electrode 1092 has pierced through the electric heating layer of said electric heating paper 101 and is well connected with said electric heating layer. Meanwhile, another end of said needle electrode 1092 has also pierced through the insulation layer of said conductor 110 that passes through a passage arranged in said plastic housing and is well connected with said conductor 110. In addition, the insulation glue 1093 has filled all the space in said plastic housing 1091 including the space of the conductor passage. As also shown in FIG. 8, at the most end of a needle tip, a step is arranged such that the distance between said step to the top of the needle tip can be determined based on the thickness of said electric heating layer. Said step can not only used to increase the contact area of said needle electrode with said electric heating layer, it can also position and limit said needle electrode and thus eliminating the possibility that said needle electrode 1092 pierces through both the electric heating layer as well as the thermal diffusion layer 104 and thus cause damages to the electric heating laminate floor.

The electric heating paper shown in FIG. 5 or FIG. 6 can be used in the electric heating laminate floor shown in FIG. 8 and in these cases the needle electrode 1092 is connected directly with the metal foil or metallic ink to increase the contact area of the electrode and the electric heating layer, decrease the contact resistance and thus eliminating the possibility of local overheat.

Figure 9:
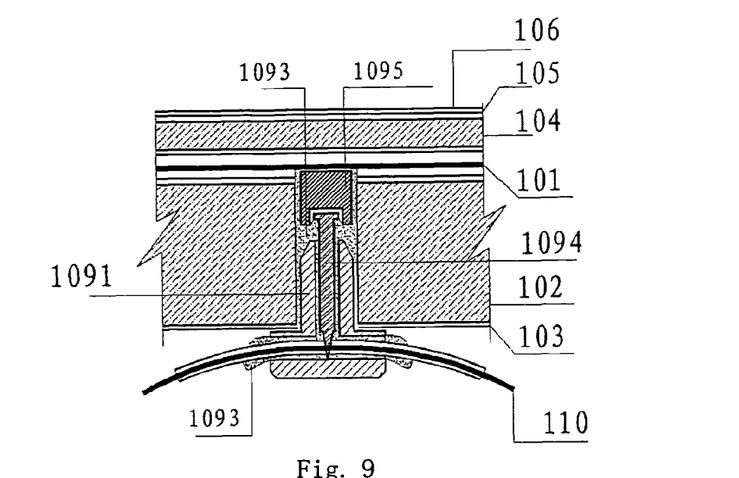
FIG. 9 is another A-A sectional view of the electric heating floor showing another electrode specifically designed for the electric heating laminate floor of the present invention.

FIG. 9 shows another assembled piercing electrode. In order to improve reliability of the connection between the assembled piercing electrode and the electric heating layer, the needle electrode 1092 shown in FIG. 8 is redesigned to the shape of the needle electrode 1094 shown in FIG. 9. Further, a soft, heat resistant and aging resistant conductive rubber is arranged between the needle electrode 1094 and the electric heating paper to increase the contact area of the electrode with the electric heating paper and improve the reliability of connection between said electrode and the electric heating layer. Thus, it would be impossible that the thermal diffusion layer 104 is transpierced by said needle electrode due to said thermal diffusion layer having a relatively thinner thickness. Said conductive rubber can be silicone rubber, for example, or any other soft conductive material.

The assembled piercing electrode presents following advantages: 1) easy to install on spot; 2) ensure the insulation property of the electric heating laminate floor; 3) safe and reliable.

Of course, any other type of electrode may also be utilized to supply power to the electric heating laminate floor shown in FIG. 7

The electric heating laminate floor shown in FIG. 7 can be paved in a conventional way. When paving the electric heating laminate floor of the present invention, the whole room can be paved, or only a portion of the room is paved where a heating is required, such as the areas adjacent to a sofa or the areas adjacent to a bed. A temperature monitor can also be used for controlling the heating temperature of the electric heating laminate floor. Said temperature monitor can be, but without limitation to, a dual-temperature monitor, which presets the heating temperature of the floor as well as the indoor temperature to facilitate temperature auto control.

When power is supplied, the surface temperature of the electric heating laminate floor shown in FIG. 7 can be up to 15-70° C. within 5 minutes. Moreover, the surface temperature can be maintained consistently in the range of 15-70° C. when the power is supplied for 5, 10, 30, 60 and 120 minutes. Particularly, the electric heating floor having a substantially homogeneously screen-printed mesh-shape electric heating layer exhibits much better results, for example, minor differences of temperature in different areas as well as having no local overheating.

The electric heating laminate floor can save energy by 35% when compared with a conventional air conditioner or an electric heater. More advantageously, the electric heating floor of this invention has both functions of heating and decoration and thus can be widely used in homes, hotels, restaurants or other public places.

EXAMPLE 1

Using 80 g/m² kraft paper to make the electric heating paper. The formula of the electric heating coating is listed below:

| | |
|---|---|
| Natural graphite (size 300 mesh) | 250 g |
| Gelatin | 300 g |
| Water | 700 ml |

Dissolving gelatin in water and then adding therein natural graphite and the mixture was fully agitated to obtain an electric heating coating. Homogeneously screen printing said electric heating coating on the surface of the kraft paper having a size of 81 cm×12.5 cm. The printing area was 79 cm×10.5 cm and having a thickness of 40 microns. The electric heating layer so obtained was in a shape of frame. Painting insulation glue on the surface of the electric heating layer and the electric heating layer was cured at 70-90° C. When fully cured, an electrode was installed on the electric heating paper. Connecting 220 V power source, at 0-5° C. ambient temperature, the temperature of the surface of the electric heating paper was measured at 2 min, 5 min, 10 min, 30 min, 60 min and 120 min and the results are listed in the following table:

| 2 min | 5 min | 10 min | 30 min | 60 min | 120 min |
|---|---|---|---|---|---|
| 12° C. | 16° C. | 18° C. | 18° C. | 18° C. | 18° C. |

EXAMPLE 2

Using 80 g/m² kraft paper to make the electric heating paper. The formula of the electric heating coating is listed below:

| | |
|---|---|
| Natural graphite (size 300 mesh) | 250 g |
| Gelatin | 300 g |
| Water | 700 ml |

Dissolving gelatin in water and then adding therein natural graphite and the mixture was fully agitated to obtain an electric heating coating. Homogeneously screen printing said electric heating coating on the surface of the kraft paper having a size of 81 cm×12.5 cm. The printing area was 79 cm×10.5 cm and having a thickness of 80 microns. The electric heating layer so obtained was in a shape of frame. Painting insulation glue on the surface of the electric heating layer and the electric heating layer was cured at 70-90° C. When fully cured, an electrode was installed on the electric heating paper. Connecting 220 V power source, at 0-5° C. ambient temperature, the temperature of the surface of the electric heating paper was measured at 2 min, 5 min, 10 min, 30 min, 60 min and 120 min and the results are listed in the following table:

| 2 min  | 5 min  | 10 min | 30 min | 60 min | 120 min |
|--------|--------|--------|--------|--------|---------|
| 16° C. | 21° C. | 23° C. | 23° C. | 23° C. | 23° C.  |

EXAMPLE 3

Using 80 g/m² kraft paper to make an electric heating paper. The formula of the electric heating coating is listed below:

| Natural graphite (size 300 mesh) | 250 g  |
|----------------------------------|--------|
| Gelatin                          | 300 g  |
| Water                            | 700 ml |

Dissolving gelatin in water and then adding therein natural graphite and the mixture was fully agitated to obtain an electric heating coating. Homogeneously screen printing said electric heating coating on the surface of the kraft paper having a size of 81 cm×12.5 cm. The printing area was 79 cm×10.5 cm and having a thickness of 120 microns. The electric heating layer so obtained was in a shape of frame. Painting insulation glue on the surface of the electric heating layer and the electric heating layer was cured at 70-90° C. When fully cured, an electrode was installed on the electric heating paper. Connecting 220 V power source, at 0-5° C. ambient temperature, the temperature of the surface of the electric heating paper was measured at 2 min, 5 min, 10 min, 30 min, 60 min and 120 min and the results are listed in the following table:

| 2 min  | 5 min  | 10 min | 30 min | 60 min | 120 min |
|--------|--------|--------|--------|--------|---------|
| 18° C. | 24° C. | 27° C. | 27° C. | 27° C. | 27° C.  |

EXAMPLE 4

Using industry filter paper to make the electric heating paper. The formula of the electric heating coating is listed below:

| Artificial graphite + Natural graphite (size 200 mesh) | Artificial graphite 250 g + Natural graphite 288.5 g |
|--------------------------------------------------------|------------------------------------------------------|
| Gelatin                                                | 300 g                                                |
| Water                                                  | 700 ml                                               |

Dissolving gelatin in water and then adding therein artificial graphite and natural graphite and the mixture was fully agitated to obtain an electric heating coating. Homogeneously screen printing said electric heating coating on the surface of the industry paper having a size of 81 cm×12.5 cm. The printing area was 79 cm×10.5 cm and having a thickness of 40 microns. The electric heating layer so obtained was in a shape of frame. Painting insulation glue on the surface of the electric heating layer and the electric heating layer was cured at 70-90° C. When fully cured, an electrode was installed on the electric heating paper. Connecting 220 V power source, at 0-5° C. ambient temperature, the temperature of the surface of the electric heating paper was measured at 2 min, 5 min, 10 min, 30 min, 60 min and 120 min and the results are listed in the following table:

| 2 min  | 5 min  | 10 min | 30 min | 60 min | 120 min |
|--------|--------|--------|--------|--------|---------|
| 16° C. | 21° C. | 22° C. | 22° C. | 22° C. | 22° C.  |

EXAMPLE 5

Using industry filter paper to make the electric heating paper. The formula of the electric heating coating is listed below:

| Artificial graphite + Natural graphite (size 200 mesh) | Artificial graphite 250 g + Natural graphite 288.5 g |
|--------------------------------------------------------|------------------------------------------------------|
| Gelatin                                                | 300 g                                                |
| Water                                                  | 700 ml                                               |

Dissolving gelatin in water and then adding therein artificial graphite and natural graphite and the mixture was fully agitated to obtain an electric heating coating. Homogeneously screen printing said electric heating coating on the surface of the industry filter paper having a size of 81 cm×12.5 cm. The printing area was 79 cm×10.5 cm and having a thickness of 80 microns. The electric heating layer so obtained was in a shape of frame. Painting insulation glue on the surface of the electric heating layer and the electric heating layer was cured at 70-90° C. When fully cured, an electrode was installed on the electric heating paper. Connecting 220 V power source, at 0-5° C. ambient temperature, the temperature of the surface of the electric heating paper was measured at 2 min, 5 min, 10 min, 30 min, 60 min and 120 min and the results are listed in the following table:

| 2 min  | 5 min  | 10 min | 30 min | 60 min | 120 min |
|--------|--------|--------|--------|--------|---------|
| 22° C. | 27° C. | 28° C. | 28° C. | 28° C. | 28° C.  |

EXAMPLE 6

Using industry filter paper to make the electric heating paper. The formula of the electric heating coating is listed below:

| Artificial graphite + natural graphite (size 3000 mesh) | Artificial graphite 250 g + natural graphite 288.5 g |
|---------------------------------------------------------|------------------------------------------------------|
| Gelatin                                                 | 300 g                                                |
| Water                                                   | 700 ml                                               |

Dissolving gelatin in water and then adding therein artificial graphite and natural graphite and the mixture was fully agitated to obtain an electric heating coating. Homogeneously screen printing said electric heating coating on the surface of the industry filter paper having a size of 81 cm×12.5 cm. The printing area was 79 cm×10.5 cm and having a thickness of 120 microns. The electric heating layer so obtained was in a shape of frame. Painting insulation glue on the surface of the electric heating layer and the electric heating layer was cured at 70-90° C. When fully cured, an electrode was installed on the electric heating paper. Connecting 220 V power source, at 0-5° C. ambient temperature, the temperature of the surface of the electric heating paper was measured at 2 min, 5 min, 10 min, 30 min, 60 min and 120 min and the results are listed in the following table:

| 2 min | 5 min | 10 min | 30 min | 60 min | 120 min |
|-------|-------|--------|--------|--------|---------|
| 26° C. | 31° C. | 32° C. | 32° C. | 32° C. | 32° C. |

EXAMPLE 7

Using 80 g/m² kraft paper to make the electric heating paper. The formula of the electric heating coating is listed below:

| | |
|---|---|
| Natural graphite (size 3000 mesh) | 1650 g |
| Polyurethane | 300 g |
| Acetone | 700 ml |

Dissolving polyurethane in acetone and then adding therein natural graphite and the mixture was fully agitated to obtain an electric heating coating. Homogeneously screen printing said electric heating coating on the surface of the kraft paper having a size of 81 cm×12.5 cm. The printing area was 79 cm×10.5 cm and having a thickness of 80 microns. The electric heating layer so obtained was in a shape of frame. Painting insulation glue on the surface of the electric heating layer and the electric heating layer was cured at 70-90° C. When fully cured, an electrode was installed on the electric heating paper. Connecting 220 V power source, at 0-5° C. ambient temperature, the temperature of the surface of the electric heating paper was measured at 2 min, 5 min, 10 min, 30 min, 60 min and 120 min and the results are listed in the following table:

| 2 min | 5 min | 10 min | 30 min | 60 min | 120 min |
|-------|-------|--------|--------|--------|---------|
| 45° C. | 50° C. | 52° C. | 52° C. | 52° C. | 52° C. |

EXAMPLE 8

Using 80 g/m² kraft paper to make the electric heating paper. The formula of the electric heating coating is listed below:

| | |
|---|---|
| Natural graphite (size 2000 mesh) | 850 g |
| Silicon carbide powder (size 800 mesh) | 150 g |
| Polyurethane | 300 g |
| Acetone | 700 ml |

Dissolving polyurethane in acetone and then adding therein natural graphite and silicon carbide powder and the mixture was fully agitated to obtain an electric heating coating. Homogeneously screen printing said electric heating coating on the surface of the kraft paper having a size of 81 cm×12.5 cm. The printing area was 79 cm×10.5 cm and having a thickness of 160 microns. The electric heating layer so obtained was in a shape of frame. Painting insulation glue on the surface of the electric heating layer and the electric heating layer was cured at 70-90° C. When fully cured, an electrode was installed on the electric heating paper. Connecting 220 V power source, at 0-5° C. ambient temperature, the temperature of the surface of the electric heating paper was measured at 2 min, 5 min, 10 min, 30 min, 60 min and 120 min and the results are listed in the following table:

| 5 min | 30 min | 60 min | 120 min | 240 min | 480 min |
|-------|--------|--------|---------|---------|---------|
| 46° C. | 52° C. | 52° C. | 52° C. | 52° C. | 52° C. |

EXAMPLE 9

Using 80 g/m² kraft paper to make the electric heating paper. The formula of the electric heating coating is listed below:

| | |
|---|---|
| Natural graphite (size 800-2000 mesh) | 850 g |
| Polyurethane | 150 g |
| Acetone | 450 ml |
| Silicon carbide powder (size 800-2000 mesh) | 50 g |
| KH-550 | 8 g |
| Antimony trioxide | 30 g |
| Dioctyl phthalate | 35 g |

Dissolving polyurethane in acetone and then adding therein natural graphite, silicon carbide powder, KH-550, antimony trioxide and dioctyl phthalate and the mixture was fully agitated to obtain an electric heating coating. Homogeneously screen printing said electric heating coating on the surface of the kraft paper having a size of 81 cm×12.5 cm. The printing area was 79 cm×10.5 cm and having a thickness of 160 microns. The electric heating layer so obtained was in a shape of a frame. Painting insulation glue on the surface of the electric heating layer and the electric heating layer was cured at 70-90° C. When fully cured, an electrode was installed on the electric heating paper. Connecting 220 V power source, at 0-5° C. ambient temperature, the temperature of the surface of the electric heating paper was measured at 2 min, 5 min, 10 min, 30 min, 60 min and 120 min and the results are listed in the following table:

| 2 min | 5 min | 10 min | 30 min | 60 min | 120 min |
|-------|-------|--------|--------|--------|---------|
| 46° C. | 51° C. | 53° C. | 53° C. | 53° C. | 53° C. |

EXAMPLE 10

Distinct from Example 9, the electric heating coating was homogeneously screen printed on the kraft paper in a shape of mesh. The temperature of the surface of the electric heating paper was measured at 2 min, 5 min, 10 min, 30 min, 60 min and 120 min and the results are listed in the following table:

| 2 min  | 5 min  | 10 min | 30 min | 60 min | 120 min |
|--------|--------|--------|--------|--------|---------|
| 46° C. | 52° C. | 54° C. | 54° C. | 54° C. | 54° C.  |

It was found that the temperatures at 5 different positions of the surface of the electric heating paper did not have apparent differences.

EXAMPLE 11

The electric heating paper of Example 10 was used to produce an electric heating laminate floor according to the method described above and the assembled piercing electrode was installed on said floor to connect a 220 V power source. At 0-5° C. ambient temperature, the temperature of the surface of the electric heating floor was measured at 2 min, 5 min, 10 min, 30 min, 60 min and 120 min and the results are listed in the following table:

| 2 min  | 5 min  | 10 min | 30 min | 60 min | 120 min |
|--------|--------|--------|--------|--------|---------|
| 40° C. | 52° C. | 53° C. | 53° C. | 53° C. | 53° C.  |

Having described the preferred embodiments of the invention, it is understood that the invention defined by the appended claims is not to be limited by particular details set forth in the above description, as many apparent variations thereof are possible without departing from the spirit or scope thereof.

What is claimed is:

1. An electrical heating laminate floor, comprising:
at least one layer of any of a base material layer, a balance layer, a thermal diffusion layer, a decoration layer and a rear resistant layer; and
an electrical heating material, wherein the electrical heating material being positioned between the base material layer and the thermal diffusion layer, and the electrical heating material comprising a substrate and an electrical heating layer substantially homogeneously attached to the substrate; the electrical heating layer being prepared using an electrical heating coating; the electrical heating coating comprising an electrical heating base material and a binder; and the substrate is a plastic, a kraft paper, a writing paper, a printing paper having a plurality of apertures arranged therein, or an industry filter paper, an untreated base paper having good permeability, an industry filter cloth, a densely spined glass cloth, a non-woven cloth, a common cotton cloth or a chemical fiber cloth.

2. The electrical heating laminate floor according to claim 1, wherein the electrical heating layer is obtained by screen printing the electrical heating coating on the substrate.

3. The electrical heating laminate floor according to claim 2, wherein the electrical heating layer is in a shape of frame or grid.

4. The electrical heating laminate floor according to claim 3, wherein the electrical heating base material is selected from a group consisting of natural graphite, artificial graphite, conductive carbon black, or combinations thereof; the binder is selected from a group consisting of acrylic resin, epoxy resin, polyurethane, melamine, gelatin, carboxymethyl cellulose, or polyvinyl alcohol.

5. The electrical heating laminate floor according to claim 4, wherein the electrical heating base material and the binder forms a principal formula of the electrical heating coating, and wherein the amount of the binder is 15-95% by weight of the principal formula, the amount of the electrical heating base material is 5-85% by weight of the principal formula.

6. The electrical heating laminate floor according to claim 5, wherein the electrical heating layer having a thickness in a range of from 5 microns to 200 microns.

7. A method of making an electrical heating laminate floor comprising:
providing an electrical heating material;
providing a base material layer and making apertures for installation of electrodes;
providing a thermal diffusion layer, a balance layer, a decoration layer and/or a wear resistant layer;
coating an insulation glue on both sides of the electrical heating material and putting the electrical heating material between the base material layer and the thermal diffusion layer to obtain a combination body; and
combining the combination body and the balance layer, the decoration layer and/or the wear resistant layer to obtain the electrical heating laminate floor,
wherein the electrical heating material comprising a substrate and an electrical heating layer substantially homogeneously attached to the substrate; the electrical heating layer being prepared using an electrical heating coating; the electrical heating coating comprising an electrical heating base material and a binder; and the substrate is a plastic, a kraft paper, a writing paper, a printing paper having a plurality of apertures arranged therein, or an industry filter paper, an untreated base paper having good permeability, an industry filter cloth, a densely spined glass cloth, a non-woven cloth, a common cotton cloth or a chemical fiber cloth.

8. The electric heating laminate floor made according to the method of claim 7, further comprising apertures prepared in at least one base material layer for installation of electrodes, further including an assembled piercing electrode, said assembled piercing electrode comprises a plastic housing and a needle electrode, said needle electrode is inserted in said plastic housing; said plastic housing is inserted in an aperture prepared on said base material layer in a tight fit manner; said one end of the needle electrode connects the electric heating layer firmly, and another end of the needle electrode pierces through the insulation layer of a conductor located in said plastic housing and connects firmly to the conductor.

9. The electric heating laminate floor according to claim 8, wherein one end of the said needle electrode has a tip and said tip pierces through said electric heating layer and connects firmly thereto.

10. The electric heating laminate floor according to claim 8, wherein one end of said needle electrode connects firmly to the electric heating layer by a conductive rubber.

11. The electric heating laminate floor according to claim 9, wherein a layer of conductive metallic ink is printed in the area where said electric heating material connects with said assembled piercing electrode.

12. The electric heating laminate floor according to claim 9, wherein a layer of metal foil is arranged in the area where electric heating material connects with said assembled piercing electrode.

13. The electric heating laminate floor according to claim 12, wherein said metal foil is a copper foil or an aluminum foil.

* * * * *